Sept. 9, 1924.

M. L. BEESON 1,507,807

ELECTRICALLY HEATED TROWEL

Filed March 19, 1923

HEATING ELEMENT

INVENTOR.
MARVIN L. BEESON.
BY A. B. Bowman
ATTORNEY

Patented Sept. 9, 1924.

1,507,807

UNITED STATES PATENT OFFICE.

MARVIN L. BEESON, OF LOS ANGELES, CALIFORNIA.

ELECTRICALLY-HEATED TROWEL.

Application filed March 19, 1923. Serial No. 625,945.

*To all whom it may concern:*

Be it known that I, MARVIN L. BEESON, a citizen of the United States, residing at Los Angeles, in the county of Los Angeles and State of California, have invented a certain new and useful Electrically-Heated Trowel, of which the following is a specification.

My invention relates to trowels, particularly to electrically heated trowels adapted to be used in finishing mastic flooring, wall structures and paving or in laying composition roofing paper having an asphaltic or similar base, and the objects of my invention are: first, to provide a trowel of this class for finishing flooring, walls, paving or roofing, which is very light of weight and may be easily manipulated and used in places inaccessible by conventional heated rollers or like apparatus, used for this purpose, which are of great weight and cumbersome; second, to provide a trowel of this class for heating the mastic or asphaltic material used for said purposes, for making the same more plastic or pliable and providing efficient means for smoothing and finishing the same; third, to provide a novelly constructed, electrically heated trowel, and fourth, to provide a device of this class which is particularly simple and economical of construction, durable, compact and which will not readily deteriorate or get out of order.

Figure 1:
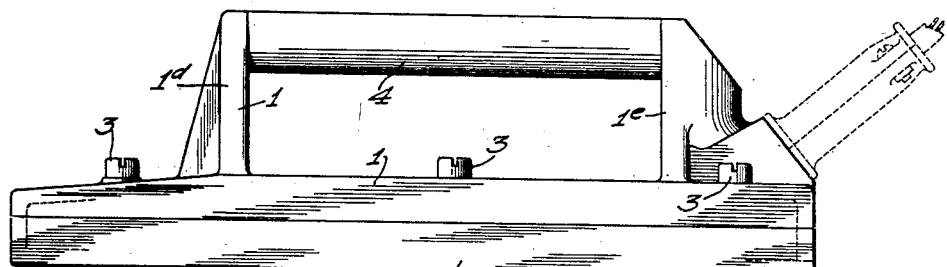
Figure 2:
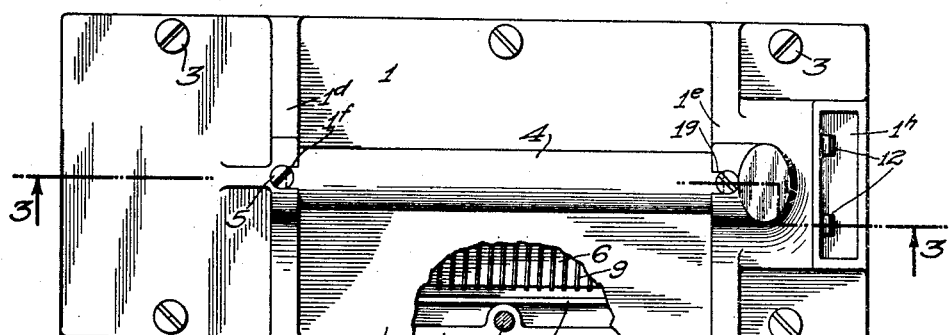
Figure 3:
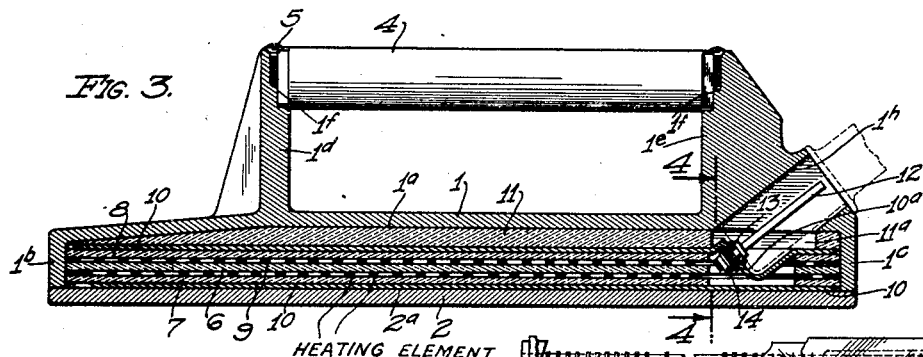
Figure 4:
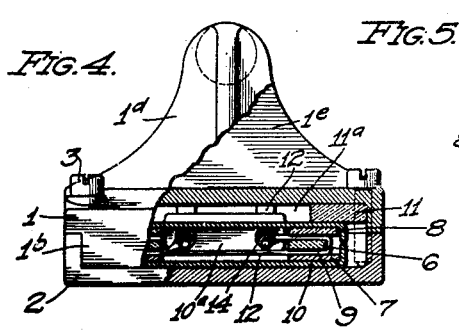
Figure 5:
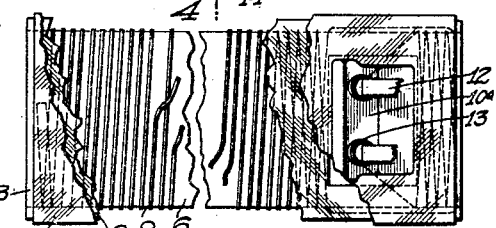

With these and other objects in view, as will appear hereinafter, my invention consists of certain novel features of construction, combination and arrangement of parts and portions as will be hereinafter described in detail, and particularly set forth in the appended claims, reference being had to the accompanying drawings and to the characters of reference thereon, which form a part of this application, in which:

Figure 1 is a side elevational view of my electrically heated trowel, showing by dotted lines an electric plug for connecting the same to a source of electrical energy; Fig. 2 is a plan view of my trowel with certain parts and portions broken away to facilitate the illustration; Fig. 3 is a sectional elevational view thereof taken through 3—3 of Fig. 2, showing certain parts and portions in elevation to facilitate the illustration; Fig. 4 is a front elevational view thereof, partly in section with the sectional portion taken through 4—4 of Fig. 3; and Fig. 5 is a fragmentary, slightly reduced, plan view of the heating unit, showing certain parts and portions broken away to facilitate the illustration.

Like characters of reference refer to similar parts and portions throughout the several views of the drawings.

The upper casing member 1, lower casing member 2, screws 3, handle member 4, screws 5, insulating members 6, 7 and 8, heating element 9, heating element casing 10, heat insulating member 11, terminal posts 12, insulating washers 13, and the nuts 14, constitute the principal parts and portions of my electrically heated trowel.

The casing of my trowel consists of an upper casing member 1 and a lower casing member 2, secured together by means of screws 3. The casing member 1 is provided at its under side with a hollowed out portion 1$^a$, likewise the casing member 2 is provided at its upper side with a hollowed out portion 2$^a$, said hollowed out portions forming a compartment for the reception of the heating unit of my trowel. The front portion of the upper casing member is slightly reduced in thickness to reduce its weight, to permit the trowel being used in narrower spaces and otherwise to facilitate its handling. It will be noted that the lower casing member 2 is rectangularly shaped with straight sides and ends, and plane at its bottom to facilitate the smoothing and finishing of the flooring, walls, paving or roofing. The front and rear walls 1$^b$ and 1$^c$ of the upper casing member 1, forming the hollowed out portion, extend into the lower casing member 2 to securely position the members 1 and 2 with each other. The member 1 is provided on its upper side with upwardly extending lugs 1$^d$ and 1$^e$, which are provided respectively with slots 1$^f$ and 1$^g$ on their inner sides, extending therein from their upper ends for the reception of the lug portions of the handle member 4. The handle member 4 is held in position on said lugs 1$^d$ and 1$^e$ by the heads of the screws 5, which are screwed into the upper ends of said lugs, the heads of which bear against the lug portions of the handle member 4.

The heating unit of my trowel consists of heating element 9, supported and wound on the insulating member 6, preferably a plate of mica, positioned in the sheet metal casing 10, which surrounds the same and is insulated therefrom by the insulating members 7 and 8, also preferably of mica. The heating element is so wound on the member 6 that the center of its length, which is the portion of greatest resistance and heat, is positioned near its front end, the element extending backwardly from the front portion of the trowel in double, intermediate and contiguous order. A heat resisting material 11, preferably of asbestos, is positioned between the upper portion of the heating element casing and the wall of the upper casing member 1, to reduce the conduction of heat thereto, therefore minimizing the loss of heat.

The rear upper portion of the heating element casing 10 is provided with an inclined, offset portion 10$^a$, the front portion of which extends above the upper portion of the casing and the rear portion extends below the upper portion of the same. The mica insulating members 6, 7 and 8 are provided with openings near their rear ends to receive the offset portion 10$^a$ of the casing 10, as shown best in Fig. 3 of the drawings. The heat insulating member 11 is also provided with an opening, through which extend the terminal posts 12, which are secured to the inclined, offset portion of the casing 10 by the nuts 14, and are insulated therefrom by the insulating washers 13, also as shown best in Fig. 3 of the drawings. The ends of the heating element 9 are also secured to the terminal posts 12 by the nuts 14, as shown in Fig. 4 of the drawings. The upper casing member 1 is also provided at its rear portion with an opening 1$^h$, into which extend the terminal posts 12, and which opening is also adapted to receive and retain the plug for connecting the trowel to a source of electrical energy.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

It is obvious that with this construction there is provided an electrically heated trowel for heating mastic or asphaltic materials, so they may be made more plastic and pliable, for smoothing and finishing the same on floors, wall structures, roofs and the like; that there is provided a trowel of this class which is very light and may be easily manipulated and is of such a size and shape as to be easily accessible to small places, and that I have provided a trowel of this class which is novel, very simple and economical of construction, durable, efficient and which will not readily deteriorate or get out of order.

Having thus described my invention, what I claim as new and desire to secure by Letters Patent is:

1. A trowel of the class described, including an upper casing member provided with upwardly extending handle supporting portions at its upper side and a hollow portion in its under side, a lower casing member provided with a hollow portion in its upper side, secured to said upper casing member, a handle secured to the handle supporting portions of said upper casing member, a readily removable heating unit positioned in the hollow portion between said casing members and clamped therebetween, and heat insulating material positioned between said heating unit and said upper casing member.

2. A trowel of the class described, including an upper casing member provided with upwardly extending handle supporting portions at its upper side and a hollow portion in its under side, a lower casing member provided with a hollow portion in its upper side, secured to said upper casing member, a handle secured to the handle supporting portions of said upper casing member, a readily removable heating unit positioned in the hollow portion between said casing members and clamped therebetween, said heating unit including an insulating member, an electric heating element extending around said insulating member, a metal casing extending around said heating element, an electric insulating member positioned between said casing and said heating element, and heat insulating material positioned between said casing and said upper casing member.

3. A trowel of the class described, including upper and lower casing members, provided with a hollow portion between the same, said casing members being rectangular in shape, a handle member secured to said upper casing member, a readily removable heating unit, positioned in the hollow portion between said casing members, and heat insulating material positioned between said heating unit and said upper casing member.

4. A trowel of the class described, including a lower casing member, rectangular in shape, and having straight sides and ends, and provided in its upper side with a hollow portion, an upper casing member provided with a handle-supporting portion at its upper side, and a heating unit positioned in the hollow portion of said lower casing member.

5. A trowel of the class described, including a lower casing member, rectangular in shape, and having straight sides and ends, and provided in its upper sides with a hollow portion, an upper casing member provided with a handle-supporting portion at its upper side, a heating unit positioned in the hollow portion of said lower casing member, and heat insulating material positioned between said heating unit and said upper casing member.

6. A trowel of the class described, including a lower casing member, rectangular in shape, and having straight sides and ends, and provided in its upper side with a hollow portion, an upper casing member provided with a handle-supporting portion at its upper side, and a heating unit positioned in the hollow portion of said lower casing member, said heating unit including an insulating member, an electric heating element extending around said insulating member, a metal casing extending around said heating element, and electric insulating members positioned between said casing and said heating element.

7. A trowel of the class described, including a lower casing member, rectangular in shape, and having a straight side and ends, and provided in its upper side with a hollow portion, an upper casing member provided with a handle-supporting portion, extending upwardly from its upper side, and its front portion decreasing in thickness towards its front end, and a heating unit positioned between said casing members.

8. A trowel of the class described, including an upper casing member, a lower casing member, secured to the lower side of said upper casing member, said casing members being provided with a hollow portion between the same, a heating unit positioned in the hollow portion of said casing member and clamped therebetween, said heating unit including an insulating member, an electric heating element extending around said insulating member, a metal casing extending around said heating element, and electric insulating members positioned between said casing and said heating element.

9. A heating apparatus, including casing members, a handle for said casing members and a readily removable heating unit positioned between said casing members, said heating unit including an insulating member, an electric heating element extending around said insulating member, a metal casing extending around said heating element, and electric insulating members positioned between said casing and said heating element, and terminal posts connected to said heating element and supported by said heating element casing.

In testimony whereof, I have hereunto set my hand at Los Angeles, California, this 7th day of March, 1923.

MARVIN L. BEESON.